United States Patent [19]

Aoyama et al.

[11] Patent Number: 5,132,843
[45] Date of Patent: Jul. 21, 1992

[54] GRATING LENS AND FOCUSING GRATING COUPLER

[75] Inventors: Shigeru Aoyama; Masami Tada, both of Takatsuki; Hayami Hosokawa, Yawata; Noriyoshi Horie, Moriyama; Tukasa Yamashita, Nara, all of Japan

[73] Assignee: Omron Corporation, Kyoto, Japan

[21] Appl. No.: 491,095

[22] Filed: Mar. 9, 1990

[30] Foreign Application Priority Data

Mar. 16, 1989 [JP] Japan ................................ 1-65277
Feb. 27, 1990 [JP] Japan ................................ 2-44525

[51] Int. Cl.$^5$ ............................................. G02B 5/18
[52] U.S. Cl. ................................. 359/573; 359/575; 359/742; 385/37
[58] Field of Search ........... 350/96.15, 162.16, 162.17, 350/162.2, 162.22, 167, 452; 359/565, 566, 569, 571, 573, 575, 742; 385/35, 36, 37

[56] References Cited

U.S. PATENT DOCUMENTS

| | | | |
|---|---|---|---|
| 3,814,498 | 6/1974 | Tomlinson, III et al. | 350/162.2 |
| 4,281,894 | 8/1981 | Guha | 350/166 |
| 4,340,283 | 7/1982 | Cohen | 359/565 |
| 4,609,259 | 9/1986 | Suemitsu et al. | 350/320 |
| 4,737,447 | 4/1988 | Suzuki et al. | 350/452 |
| 4,787,722 | 11/1988 | Claytor . | |
| 4,798,446 | 1/1989 | Hettrick | 350/162.24 |
| 4,904,069 | 2/1990 | Nakata | 359/742 |
| 4,936,666 | 6/1990 | Futhey | 350/162.17 |
| 4,940,308 | 7/1990 | Debesis | 350/162.2 |
| 5,054,905 | 10/1991 | Cohen | 359/573 |

FOREIGN PATENT DOCUMENTS 58-130448 8/1983 Japan ................................ 369/44.12

OTHER PUBLICATIONS

Peng et al, "Directional Blazing of Waves Guided by Asymmetrical Dielectric Gratings", Aug. 1974 pp. 405-409 *Optics Communications*.

Kogaku Gijutsu Contact, vol. 22, No. 4 (1984), pp. 42-52, as stated in the specification at p. 2.

H. Osterberg et al. "The Resolving Power of a Coated Objective", Jour. of the Optical Society of America, vol. 39, No. 7, Jul. 1949, pp. 553-557, as stated in the specification at p. 2.

Ura et al. "Focusing Grating for Integrated Optical-Disk Pickup Device", The Transactions of IECE of Japan, Part C, vol. J68-C, No. 10, 1985, Oct., pp. 803-810, as stated in the specification at p. 3.

Ura et al. "Aberrations of Focusing Grating for Integrated-Optic Disk-Pickup", Opto-quantum Electronics Gijutsu Kenkyu Hokoku QQE86-84 (1986) of the Denshi Joho Tsushin Gakkai (IEICE of Japan), as stated in the specification at p. 3.

Fujita et al, "Micro Fresnel Lenses Blazed by Electron-Beam Lithography", Opto-Quantum Electronics Gijutsu Kenkyu Hokoku QQE82-25 (1982) of the Denshi Joho Tsushin Gakkai (IEICE of Japan), as stated in the specification at p. 8.

S. Aoyama et al. "Super-Resulution Micro Fresnel Lens Fabricated by Electron-Beam Lithography" IOOC89 Technical Digest 20B2-1, presented at a meeting of Integrated Optics and Optical Fiber Comm. on Jul. 18-21, 1989 at Kobe in Japan.

*Primary Examiner*—Rodney B. Bovernick
*Assistant Examiner*—J. P. Ryan
*Attorney, Agent, or Firm*—Dickstein, Shapiro & Morin

[57] ABSTRACT

A grating lens is disclosed in which diffraction efficiency varies in the focusing direction of light on a surface of the lens. Also disclosed is a focusing grating coupler in which the diffraction efficiency of a grating formed on an optical waveguide, which is formed on a substrate, varies in the focusing direction of light.

7 Claims, 8 Drawing Sheets

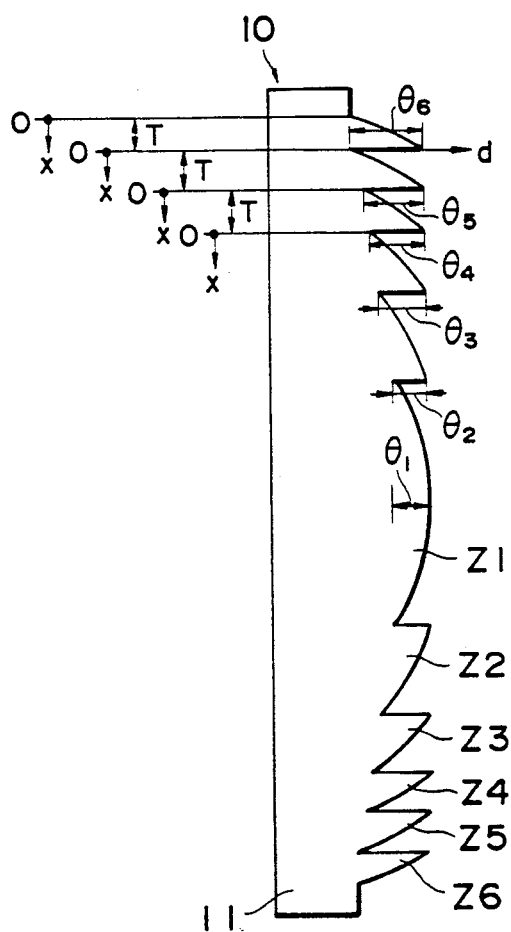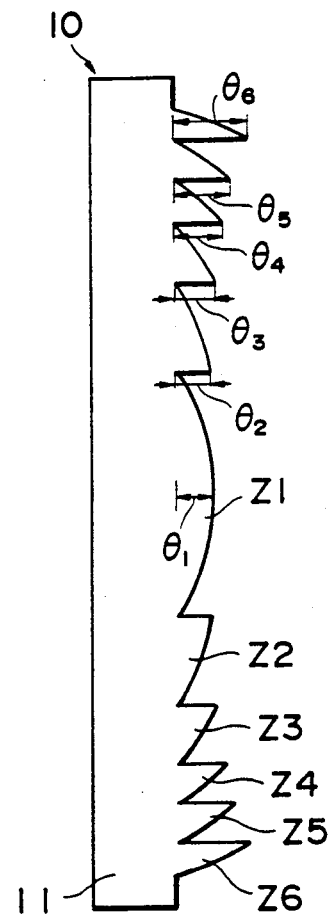

GRATING LENS AND FOCUSING GRATING COUPLER

BACKGROUND OF THE INVENTION

1. Field of the Invention

This invention relates to grating lens and a focusing grating coupler which perform focusing by utilizing the diffraction of light.

2. Description of the Related Art

Minimizing the spot size of a focused light beam is important in technology relating to the recording (writing) of data on an optical disk and reproduction (reading) of data from an optical disk. The smaller the spot diameter of the light beam, the higher the recording density can be made.

In order to obtain a small spot size, it is necessary to provide a high numerical aperture (NA) for the objective lens which condenses the light. In a case where the objective lens is a convex lens which performs focusing by utilizing the refraction of the light, a high NA is obtained by increasing the thickness of the convex lens in the direction of the optic axis and shortening the focal distance. With such a convex lens, however, machining is extremely difficult owing to the large curvature of the lens, and therefore the cost of the lens is high. If the objective lens is a micro Fresnel lens which performs focusing by utilizing diffraction of the light, a higher NA is accompanied by a smaller grating period at the periphery of the lens. In actuality, such a lens is difficult to fabricate.

In order to avoid the foregoing problems that accompany an increase in the NA of such lenses, and in order to obtain a smaller diameter for the focused beam spot, a technique is known in which use is made of a super-resolution filter (or coating). For example, refer to *Kogaku Gijutsu Contact*, Vol. 22, No. 4 (1984), pp. 42-52, and H. Osterberg et al, "The Resolving Power of a Coated Objective", in the *Journal of the Optical Society of America*, Vol. 39, No. 7, July, 1949, pp. 553-557.

A super-resolution filter described in the former publication is designed to have an amplitude transmittance distribution of the type in which the absorption of light is great at the central portion of the lens and small at the periphery. However, the super-resolution filter for reducing beam spot diameter is itself difficult to fabricate in actual practice, and a laborious operation for achieving alignment between the optic axes of the super-resolution filter and objective lens is required.

Also available in the art is a focusing grating coupler, which is one device expected to be utilizable in a next-generation optical pickup. In a focusing grating coupler, light which propagates along an optical waveguide formed on a substrate is projected to the outside of the substrate surface and focused, whereas entrant light from the outside is introduced to the optical waveguide on the substrate. If such a focusing grating coupler is utilized in an optical pickup, the latter can be made more compact and lighter in weight. For example, see Ura et. al. "Focusing Grating for Integrated Optical-Disk Pickup Device" in *The Transactions of IECE of Japan, Part C*, Vol. J68-C, No. 10, 1985, October, pp. 803-810, and Ura et. al. "Aberrations of Focusing Grating for Integrated-Optic Disk-Pickup" in the *Opto-Quantum Electronics Gijutsu Kenkyu Hokoku* OQE86- 84(1986) of the Denshi Joho Tsushin Gakkai (IEICE of Japan).

However, it is required that the focused spot diameter be reduced to about 1 $\mu$m in order to utilize the focusing grating coupler in an optical pickup. Consequently, the NA must be made large. In order to obtain a high NA, as mentioned above, the period of the grating must be made very small, the allowable error in terms of precision is small, and fabrication is difficult.

SUMMARY OF THE INVENTION

An object of the present invention is to provide a grating lens in which the spot diameter of a light beam can be made small without using a super-resolution filter.

Another object of the present invention is to provide a focusing grating coupler in which focused spot diameter can be made small without necessarily making the grating period very small.

A grating lens in accordance with the present invention is characterized in that diffraction efficiency varies in a focusing direction of light on a surface of the lens.

A focusing grating coupler according to the present invention is characterized in that diffraction efficiency of a grating formed on an optical waveguide formed on a substrate varies in a focusing direction of light.

Gratings can be classified roughly into those of an index modulation type in which the refractive index of a medium is varied periodically, and those of a relief type provided periodically with ridges and grooves. The present invention is applicable to lenses having both types of gratings. The variation in diffraction efficiency can be realized by changing the thicknesses of the grating elements, changing the refractive index, or by some other method. The grating element refers to one period of a variation in refractive index, or one period of ridges and grooves. A grating pattern can take on any form, such as that of a circle, ellipse, circular arc or straight line, depending upon the application.

In accordance with an embodiment of the invention, diffraction efficiency is set high at the peripheral portion and low at the central portion of the grating in the grating lens or focusing grating coupler. With such a construction, focused spot diameter can be made smaller, by means of the super-resolution phenomenon, than the diffraction limit decided by the wavelength of light and NA.

Accordingly, a super-resolution filter need not be used in order to obtain a small light-beam spot diameter, and therefore the optic axis alignment operation is unnecessary. In addition, it is unnecessary to make the grating period very small. Accordingly, the allowable error in terms of grating fabrication is comparatively large, and the grating can be fabricated with ease.

Thus, in accordance with the present invention as described above, a grating lens and a focusing grating coupler are provided with a diffraction efficiency distribution. As a result, the diameter of a focused beam spot can be set at will without significantly affecting the NA.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIGS. 1 and 2 illustrate an embodiment of a grating lens according to the present invention, in which FIG. 1 is a perspective view of a micro Fresnel lens, and FIG.

Figure 1:
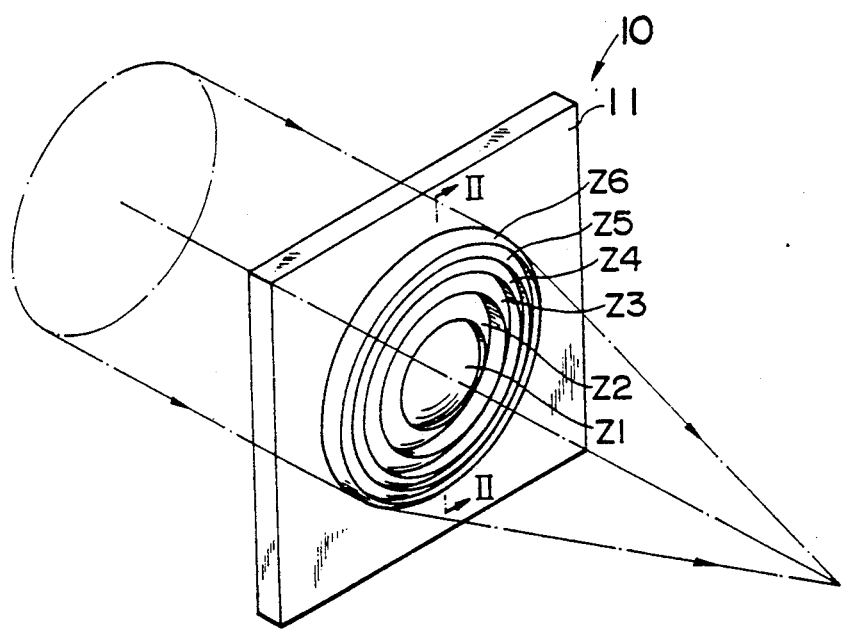
Figure 4:
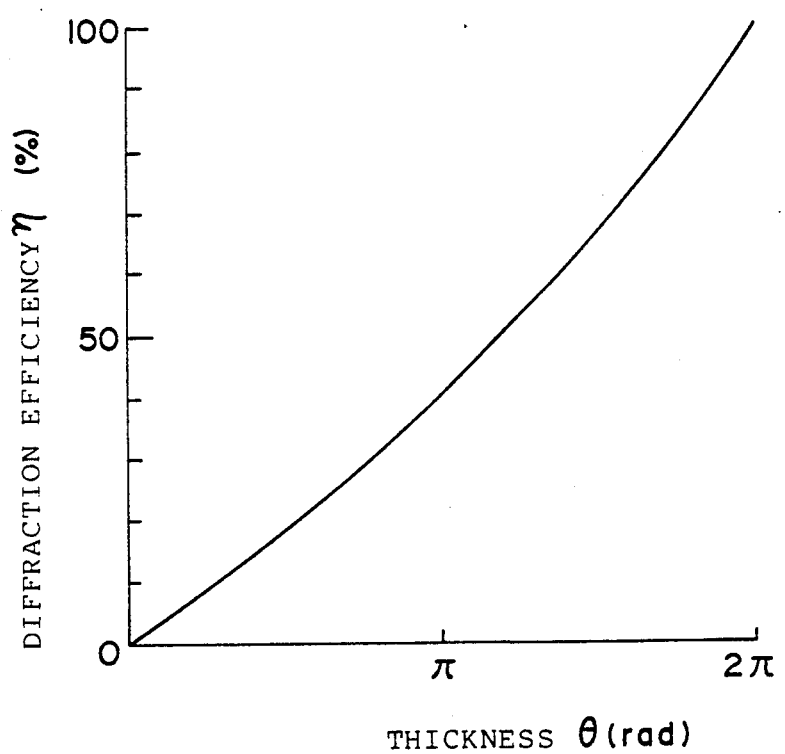
Figure 5:
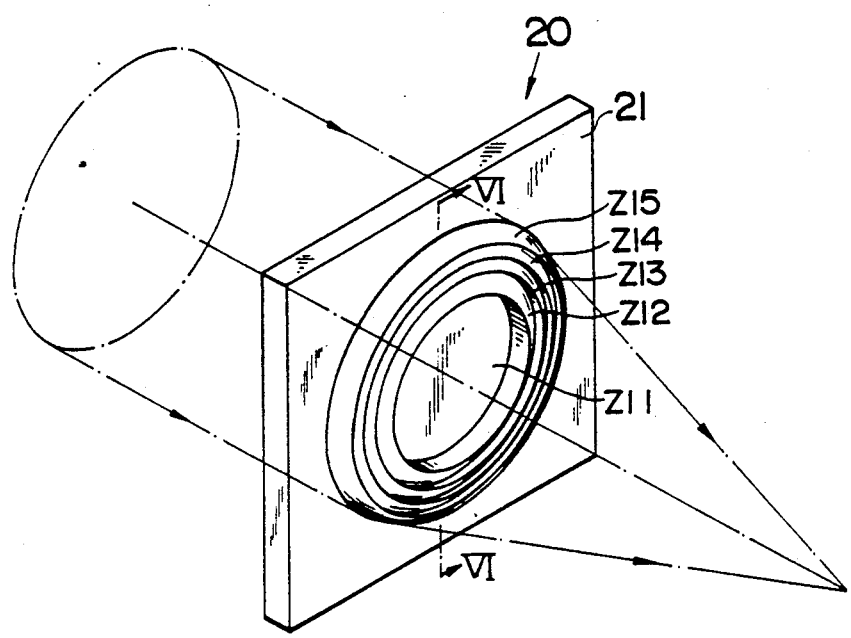
Figure 6:
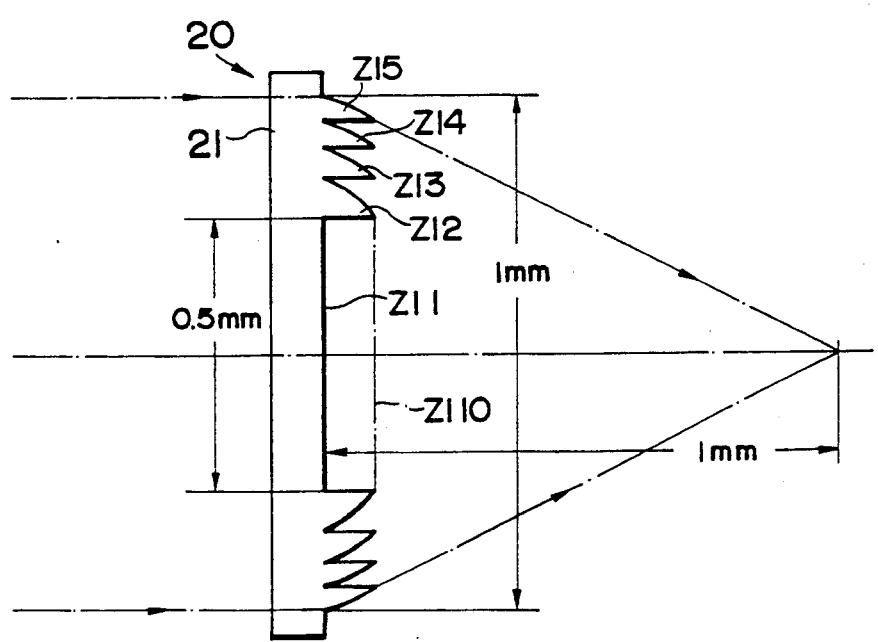
Figure 7:
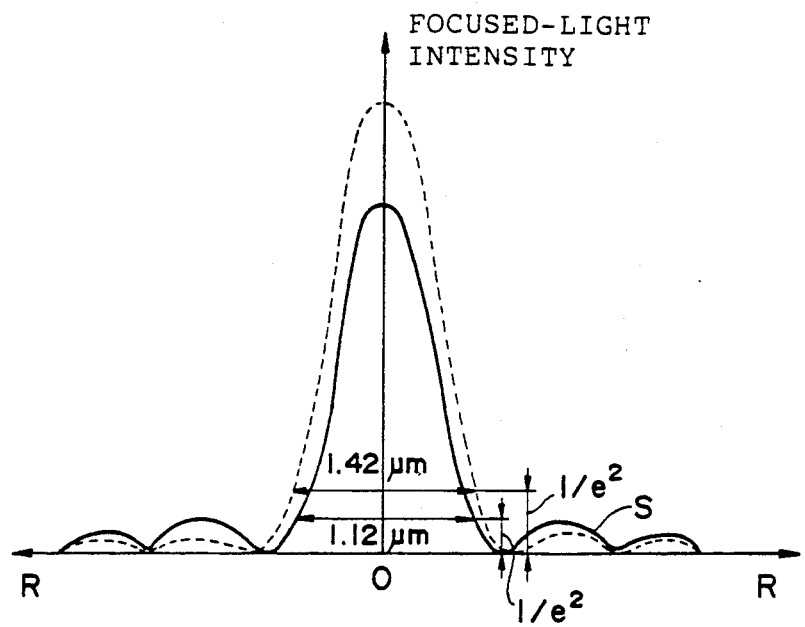
Figure 8:
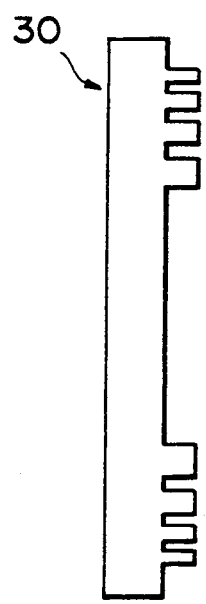
Figure 9:
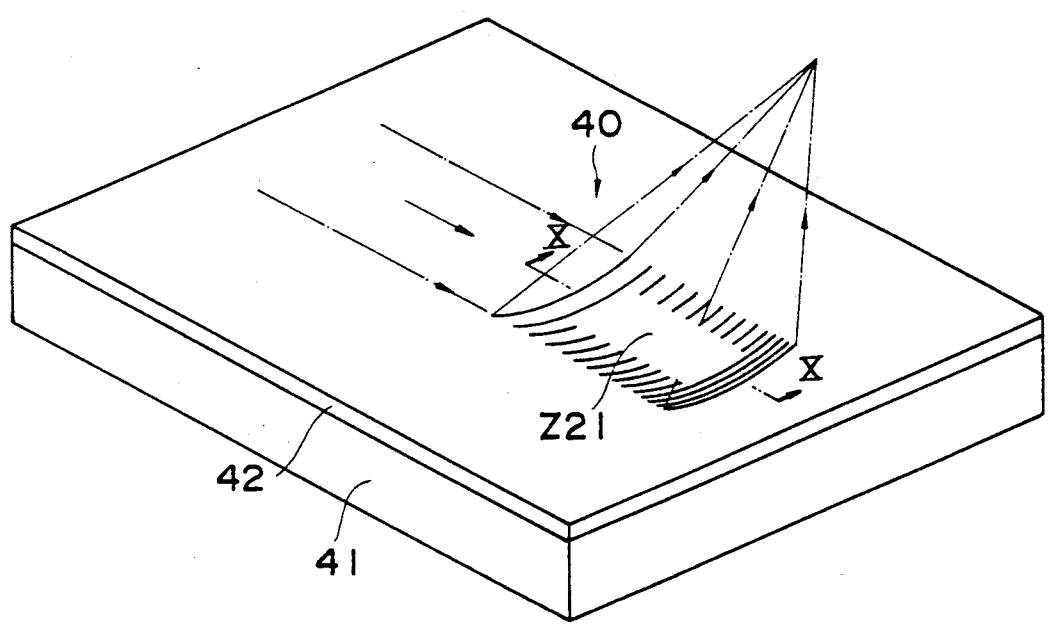
Figure 10:
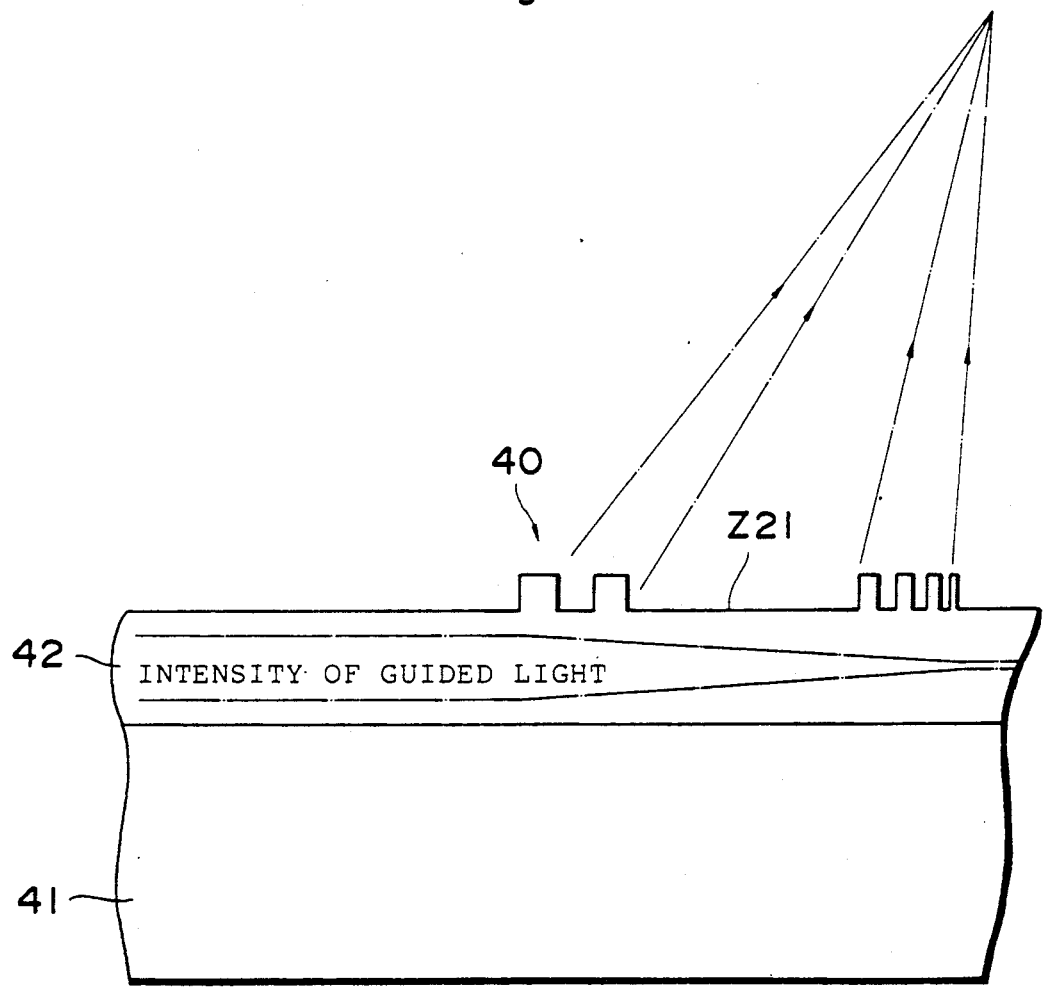
Figure 11:
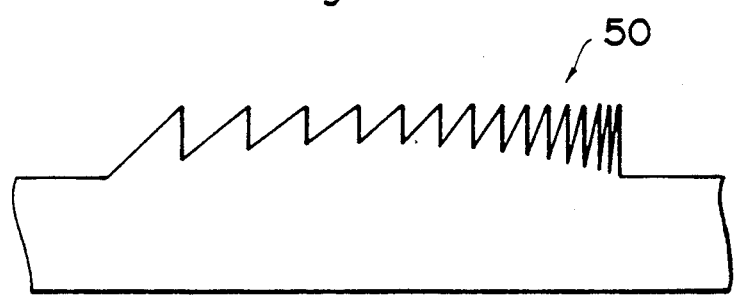
Figure 12:
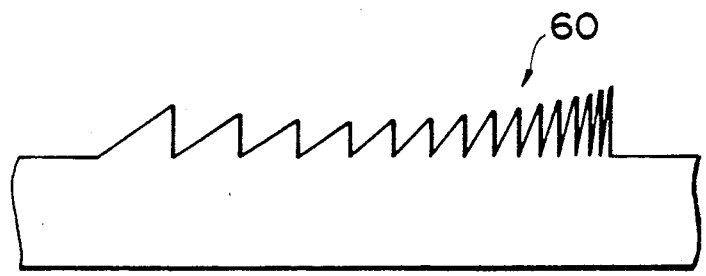

2 is an enlarged sectional view taken along line II—II of FIG. 1;

FIG. 3 is a sectional view, corresponding to FIG. 2, illustrating another way to change the thickness of a Fresnel zone in a micro Fresnel lens;

FIG. 4 is a graph showing the relationship between diffraction efficiency and grating thickness in a micro Fresnel lens;

FIGS. 5 and 6 illustrate another embodiment of a micro Fresnel lens, in which FIG. 5 is a perspective view of the micro Fresnel lens and FIG. 6 a sectional view taken along line VI—VI of FIG. 5;

FIG. 7 is a graph illustrating focused-light intensity distributions of the super-resolution micro Fresnel lens shown in FIGS. 5 and 6 and a micro Fresnel lens according to the prior art;

FIG. 8 is a sectional view, corresponding to FIG. 6, showing yet another embodiment of a micro Fresnel lens;

FIGS. 9 and 10 illustrate an embodiment of a focusing grating coupler according to the present invention, in which FIG. 9 is a perspective of the focusing grating coupler and FIG. 10 an enlarged sectional view taken along line X—X of FIG. 9; and FIGS. 11 and 12 are sectional views, corresponding to FIG. 10, showing other embodiments of a focusing grating coupler.

DESCRIPTION OF THE PREFERRED EMBODIMENTS

FIGS. 1 and 2 show an embodiment of a grating lens according to the present invention, in which a micro Fresnel lens is illustrated as the grating lens.

A micro Fresnel lens 10 has a number (only six of which are shown in the present embodiment) of Fresnel zones (grating elements) Z1–Z6 formed on a substrate 11 transparent to the light used. When seen from the plane of the substrate, the center Fresnel zone Z1 is a circle surrounded by other Fresnel zones Z2–Z6 each having the shape of an annular ring. When seen in cross section, each Fresnel zone is a ridge (with a groove being defined between mutually adjacent ridges), and the ridge is blazed. The shape of the ridge of each Fresnel zone is determined by a phase-shift function $\phi(x)$ [the phase-shift function $\phi(x)$ is indicated by Eq. (3) below]. The variable x has an origin for every zone. The closer a Fresnel zone is to the outer side of the lens, the smaller its period (width) T. This Fresnel lens 10 acts to focus incident light by the diffraction of light.

The diffraction efficiency $\eta$ of a micro Fresnel lens when a plane wave is incident upon the lens at right angles to the surface of the substrate 11 is given by the following equation:

$$\eta = (1/T) \int_0^T \exp\{j\phi(x)\}\exp\{-j(2\pi mx/T)\}dx \quad (1)$$

Assuming that diffracted light of an order higher than the second order is negligible, and considering light of the first order (primary light), we set $m=1$.

The thickness d of a Fresnel zone ridge (the height thereof, or the depth of the groove) is converted into $\theta$ (rad) by Eq. (2) shown below. Hereinafter, thickness $\theta$ is used. In Eq. (2), n represents the refractive index of the micro Fresnel lens, and $\lambda$ represents the wavelength of the incident light.

$$\theta = \{2\pi(n-1)/\lambda\}d \quad (2)$$

The phase-shift function $\phi(x)$ of every Fresnel zone is given by the following equation:

$$\phi(x) = (\theta/T)\cdot x \quad (3)$$

If Eq. (3) is substituted into Eq. (1), the following equation is obtained:

$$\eta = sinc^2(\theta - 2\pi)/2 \quad (4)$$

Here we have $$sinc\, y = sin\, y/y$$

In relation to Eq. (1) and Eq. (4), see Fujita et. al., "Micro Fresnel Lenses Blazed by Electron-Beam Lithograhy" in the *Opto-Quantum Electronics Gijutsu Kenkyu Hokoku* OQE82-25(1982) of the Denshi Joho Tsushin Gakkai (IEICE of Japan).

A graph expressing Eq. (4) is as shown in FIG. 4. As will be apparent from the graph, the diffraction efficiency $\eta$ of primary light in the micro Fresnel lens varies in dependence upon the thickness $\theta$ of the Fresnel zone. The diffraction efficiency $\eta$ becomes maximum (100%) when $\theta = 2\pi$ holds. The actual thickness d in this case is given by $d = \lambda/(n-1)$, which is obtained by substituting $\theta = 2\pi$ into Eq. (2).

In the micro Fresnel lens 10, the thickness $\theta 6$ (namely the maximum value of the thickness of this zone) of the outermost Fresnel zone Z6 is made the largest, and zone thicknesses (the maximum value of the thickness of each zone) $\theta 5, \ldots, \theta 1$ are made successively smaller the closer the Fresnel zones are to the center. As a result, the diffraction efficiency of the outermost Fresnel zone Z6 is maximum, and diffraction efficiency becomes successively smaller as the center of the lens is approached. The micro Fresnel lens 10 of this construction has the same function as that of a super-resolution filter possessing an amplitude transmittance distribution of the type in which absorption of light at the central portion of the lens is great and becomes successively smaller the nearer the periphery of the lens. Accordingly, a function equivalent to that obtained when using a super-resolution filter is realized, and a focusing effect with a smaller beam spot diameter is achieved, without necessarily increasing the NA of the micro Fresnel lens and without employing the super-resolution filter.

In the micro Fresnel lens 10 shown in FIG. 2, the Fresnel zones are formed in such a manner that the peaks of the ridges of all zones lie on the same plane. However, as shown in FIG. 3, the Fresnel zones may be formed in such a manner that the bottoms of the grooves of all zones lie on the same plane. Thus, there are various methods of coordinating Fresnel zone thickness, and any of these methods may be employed.

FIGS. 5 and 6 illustrate another embodiment of a micro Fresnel lens.

As shown in FIGS. 5 and 6, a micro Fresnel lens 20 includes a substrate 21 on which annular ring-shaped Fresnel zones Z12, ... Z15 are formed except at a central portion Z11 thereof. The thicknesses of these Fresnel lens Z12–Z15 (the maximum thickness of each zone) are all designed to be the same. The central portion Z11 is flat and does not diffract light. In other words, the diffraction efficiency here is zero. It is permissible for the height of the flat surface of the central portion to be made to agree with the peaks of the Fresnel zones Z12–Z15, as indicated by the chain line Z110.

An example will now be described, in quantitative terms, in which the spot size of light focused by such a super-resolution micro Fresnel lens 20 becomes smaller than that of light focused by a conventional micro Fresnel lens.

It will be assumed that the diameter, focal distance and NA of the super-resolution micro Fresnel lens 20 are 1 mm, 1 mm and 0.45, respectively. It will be assumed also that the diameter of the grating-free, flat central portion Z11 or Z110 is 0.5 mm. The solid line in FIG. 7 indicates the focused-light intensity distribution produced in the focal plane when a plane wave having a wavelength $\lambda = 0.78$ $\mu$m impinges upon the micro Fresnel lens 20. (In FIG. 7, R on the horizontal axis represents distance from the center.) The spot diameter for which the intensity of light attains a peak value of $1/e^2$ (where e is the base of a natural logarithm) is 1.12 $\mu$m. By contrast, the dashed line in FIG. 7 indicates the focused-light intensity distribution produced in the focal plane by a conventional micro Fresnel lens (whose diameter and focal distance are the same as those given above) whose flat central portion also is formed to have a grating. The spot diameter for which the intensity of light attains the peak value of $1/e^2$ is 1.42 $\mu$m. Accordingly, it will be understood that spot diameter is reduced to $(1.12/1.42) \times 100 = 79\%$ by super-resolution. The peak value of focused-light intensity obtained with the super-resolution micro Fresnel lens 20 is smaller than the peak light intensity obtained with the conventional micro Fresnel lens. This is due to the fact that the quantity of focused light is reduced as a result of the decline in diffraction efficiency of the central portion Z11 or Z110 of the super-resolution micro Fresnel lens 20, and the fact that the proportion of the amount of side-lobe light in the focused-light beam intensity distribution is increased.

FIG. 8 illustrates a further embodiment of a super-resolution micro Fresnel lens. This lens is formed to have annular ring-shaped Fresnel zones, except at the flat central portion thereof, and the ridges forming the Fresnel zones have a rectangular cross section (i.e., a step-type cross section).

In FIGS. 6 and 8, the thicknesses of the ridges of the annular ring-shaped Fresnel zones (the maximum thickness of each zone) may be successively larger the nearer the zone is to the outer side of the lens.

FIGS. 9 and 10 illustrate an embodiment of a focusing grating coupler according to the present invention.

As shown in FIGS. 9 and 10, a optical waveguide layer 42 is formed on a substrate 41, and a focusing grating coupler 40 is formed on the optical waveguide layer 42. The focusing grating coupler 40 is constituted by a chirped arcuate grating. Specifically, the grating element is formed to have an arcuate shape as seen from a plane, and the period of the grating decreases in the traveling direction of the guided light. The grating coupler 40 has a central zone Z21 which is free of the grating and therefore flat. Light which travels through the interior of the waveguide layer 42 in the direction of the focusing grating coupler 40 is projected obliquely upward (although it can be arranged so that the light is projected upward at right angles to the waveguide layer surface) from the waveguide layer 42 at the portion of the focusing grating coupler 40 formed to have the grating, and the projected light is focused to a single point. Guided light is not projected outwardly from the flat central portion Z21. As in the super-resolution micro Fresnel lens described above, the spot diameter of the light focused by the super-resolution phenomenon becomes smaller in comparison with the case where the flat portion Z21 is not provided. In FIG. 10, the intensity of the light which propagates through the interior of the optical waveguide layer 42 is expressed by the width of the region between the two chain lines.

As described above, the spot diameter of the focused light can be reduced by adopting super-resolution. This means that with a spot diameter of the same size, the NA can be decreased in comparison with the conventional focusing grating coupler. Accordingly, a large grating period can be obtained and fabrication of the grating is facilitated. In addition, allowable fabrication error and allowable wavelength fluctuation are mitigated as well.

FIGS. 11 and 12 illustrate other embodiments of the focusing grating coupler, in which the gratings are blazed. In other words, the ridges defining the grating elements are formed to have a triangular cross section. As for the thicknesses of the grating elements, those located at the periphery are tallest, with the grating elements becoming successively shorter toward the center of the coupler. That is, diffraction efficiency becomes successively smaller toward the center of the coupler. In the focusing grating coupler shown at numeral 50 in FIG. 11, the gratings are fabricated in such a manner that the apices of the ridges defining the grating elements are contained in the same plane. In the focusing grating coupler shown at numeral 60 in FIG. 12, the grating is fabricated in such a manner that the apices of the bottoms of the grooves of the grating elements are contained in the same plane. It goes without saying that the grating couplers 50, 60 can be so designed that the thicknesses of the grating elements vary in the width direction.

The micro Fresnel lenses and focusing grating couplers described above can readily be fabricated utilizing electron beam lithography. For example, a master of the micro Fresnel lens or focusing grating coupler is fabricated by electron beam lithography, and a stamper is formed by an electroforming process or decalcomania process using the matrix. Then, by using the stamper, the micro Fresnel lens and focusing grating coupler are reproduced by injection molding or some other molding method. In the fabrication of the focusing grating coupler, it is possible to integrally mold the optical waveguide layer and the focusing grating coupler on the substrate.

In the micro Fresnel lenses and focusing grating couplers of the embodiments described above, the distribution of grating element thickness is such that the thicknesses of the grating elements are small at the center and successively greater toward the periphery. However, a thickness distribution which is the opposite of the above can be adopted, namely one in which the thicknesses are large at the center of the device and successively smaller toward the periphery. In either case, the manner in which the diffraction efficiency varies can be set at will to conform to the particular application.

As many apparently widely different embodiments of the present invention can be made without departing from the spirit and scope thereof, it is to be understood that the invention is not limited to the specific embodiments thereof except as defined in the appended claims.

What is claimed is:

1. A diffraction grating lens comprising a body having a surface on which a plurality of grating elements are formed, each grating element comprising one period along a width direction of a ridge and a groove, said grating lens having variable period sizes, and said plurality of grating elements varying in depth along a direction of a line included in a plane parallel with said surface of said body to vary diffraction efficiency with the variation in depth of said plurality of grating elements along said direction of said line.

2. The grating lens according to claim 1, wherein said grating elements have circular patterns, and the depth of said plurality of grating elements is maximum at a peripheral portion of the lens and becomes successively smaller moving towards the center of the lens.

3. The grating lens according to claim 1, wherein a central portion of the lens is a flat surface.

4. A diffracting grating lens comprising a body having a surface on which a plurality of grating elements are formed, each grating element comprising one period, along a width direction of said grating element, of a portion having a higher refractive index and a portion having a lower refractive index said grating lens having variable period sizes, the plurality of grating elements varying in depth along a direction of a line included in a plane parallel with said surface of said body to vary diffraction efficiency with the variation in the dept of said plurality of grating elements along said direction of said line.

5. The grating lens according to claim 4, wherein each of said plurality of grating elements comprises a ridge serving as the portion having a higher refractive index and a groove serving as the portion having a lower refractive index.

6. A focusing grating coupler comprising a substrate having a surface formed with an optical waveguide thereon and a grating formed on said optical waveguide and comprising a plurality of grating elements, each grating element comprising one period of a ridge and a groove, said plurality of grating elements varying in depth along a direction of a line included in a plane parallel with the substrate surface to vary diffraction efficiency with the variation in depth of said plurality of grating elements along said direction of said line.

7. The focusing grating coupler according to claim 6, wherein a central portion of the coupler is a flat surface.

* * * * *